US009063880B2

(12) United States Patent
Kawano et al.

(10) Patent No.: US 9,063,880 B2
(45) Date of Patent: Jun. 23, 2015

(54) STORAGE DEVICE AND METHOD FOR CONTROLLING STORAGE DEVICE

(71) Applicant: Fujitsu Limited, Kawasaki-shi (JP)

(72) Inventors: Yoko Kawano, Yokohama (JP);
Terumasa Haneda, Machida (JP);
Atsushi Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 13/645,581

(22) Filed: Oct. 5, 2012

(65) Prior Publication Data

US 2013/0166857 A1 Jun. 27, 2013

(30) Foreign Application Priority Data

Dec. 22, 2011 (JP) ................................. 2011-282334

(51) Int. Cl.
G06F 13/00 (2006.01)
G06F 11/10 (2006.01)
G06F 12/02 (2006.01)
G06F 12/08 (2006.01)

(52) U.S. Cl.
CPC .......... G06F 11/108 (2013.01); G06F 12/0246 (2013.01); G06F 12/0866 (2013.01); G06F 2212/214 (2013.01); G06F 2212/7209 (2013.01)

(58) Field of Classification Search
CPC .. G06F 9/3004; G06F 9/30087; G06F 9/3834
USPC .......... 711/114, 155, 202; 714/5, 6.2–24, 763
See application file for complete search history.

(56) References Cited

U.S. PATENT DOCUMENTS

| 6,408,400 | B2 * | 6/2002 | Taketa et al. ................. 714/5.11 |
| 7,133,282 | B2 | 11/2006 | Sone | |
| 8,225,136 | B2 * | 7/2012 | Igashira et al. .............. 714/6.22 |
| 2001/0027546 | A1 * | 10/2001 | Kouchi et al. ................. 714/718 |
| 2002/0080510 | A1 * | 6/2002 | Maru ............................... 360/46 |
| 2003/0014685 | A1 * | 1/2003 | Chong, Jr. ......................... 714/5 |
| 2003/0043647 | A1 * | 3/2003 | Kanamori et al. ............ 365/200 |
| 2003/0145167 | A1 * | 7/2003 | Tomita .......................... 711/114 |

(Continued)

FOREIGN PATENT DOCUMENTS

| JP | 05-250274 | * 9/1993 |
| JP | 06-309234 | * 11/1994 |

(Continued)

OTHER PUBLICATIONS

Xiang et al, A Hybrid Approach of Failed Disk Recovery Using RAID-6 Codes: Algorithms and Performance Evaluation, May 2011, AMC, vol. 5, No N, Article A.*

(Continued)

*Primary Examiner* — Jared Rutz
*Assistant Examiner* — Khoa Doan
(74) *Attorney, Agent, or Firm* — Fujitsu Patent Center

(57) ABSTRACT

A write DMA includes a write unit, a read unit and a parity generation unit. The read unit reads parity data from one of two NAND flashes storing the parity data therein. The parity generation unit generates parity data based on the read parity data and a plurality of stripes obtained by dividing user data. The write unit writes a stripe into any of a plurality of NAND flashes storing stripes therein, and writes generated parity data into the other NAND flash from which parity data is not read.

3 Claims, 9 Drawing Sheets

(56) References Cited

U.S. PATENT DOCUMENTS

| | | | |
|---|---|---|---|
| 2004/0008554 A1* | 1/2004 | Kanamori et al. | 365/202 |
| 2005/0055622 A1* | 3/2005 | Tsukamizu | 714/758 |
| 2005/0132128 A1 | 6/2005 | Lee | |
| 2005/0246574 A1* | 11/2005 | Kanamori et al. | 714/5 |
| 2006/0233032 A1* | 10/2006 | Kanamori et al. | 365/200 |
| 2009/0113235 A1* | 4/2009 | Selinger | 714/6 |
| 2009/0300282 A1* | 12/2009 | Rowlands | 711/114 |
| 2010/0223531 A1* | 9/2010 | Fukutomi et al. | 714/764 |
| 2010/0318844 A1 | 12/2010 | Matsuda et al. | |
| 2010/0325522 A1* | 12/2010 | Tsukamoto et al. | 714/770 |
| 2010/0332946 A1* | 12/2010 | Lee et al. | 714/763 |
| 2012/0151255 A1* | 6/2012 | Lee et al. | 714/6.24 |

FOREIGN PATENT DOCUMENTS

| | | | |
|---|---|---|---|
| JP | 08-220198 | | 8/1996 |
| JP | 2000-357059 | | 12/2000 |
| JP | 2003-076615 | * | 3/2003 |
| JP | 2005-182983 | | 7/2005 |
| JP | 2005-332471 | | 12/2005 |
| WO | WO-2009098776 | | 8/2009 |

OTHER PUBLICATIONS

Blaum et al, EVENODD: an optimal scheme for tolerating double disk failures in RAID architectures, Apr. 1994, IEEE. ISBN#0-8186-5510-0.*

Corbett et al, Row-Diagonal Parity for Double Disk Failure Correction, Mar. 2, 2004, USENIX Association, Proceedings of the Third USENIX Conference on File and Storage Technologies.*

* cited by examiner

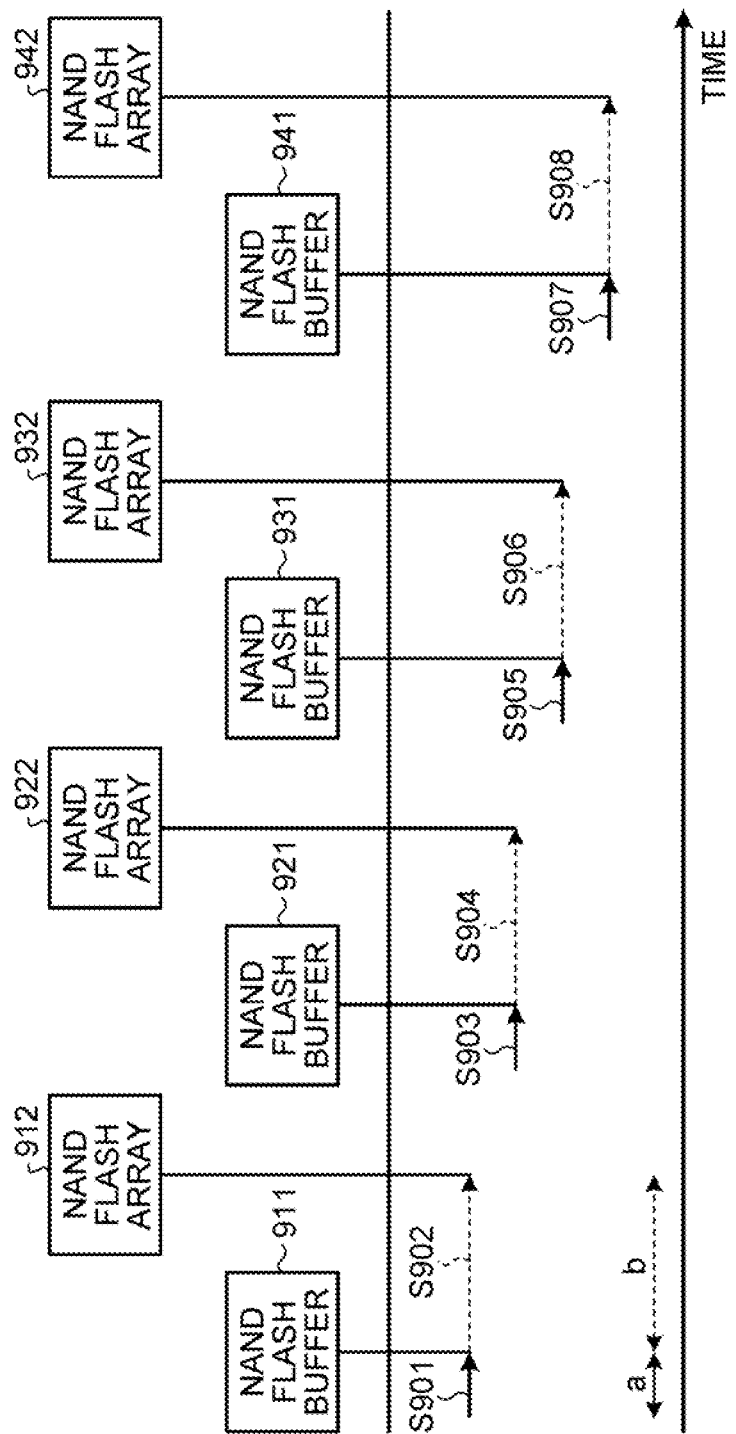

STORAGE DEVICE AND METHOD FOR CONTROLLING STORAGE DEVICE

CROSS-REFERENCE TO RELATED APPLICATION

This application is based upon and claims the benefit of priority of the prior Japanese Patent Application No. 2011-282334, filed on Dec. 22, 2011, the entire contents of which are incorporated herein by reference.

FIELD

The embodiments discussed herein are related to a storage device and a method for controlling the storage device.

BACKGROUND

A NAND flash is a semiconductor storage device for storing data without being supplied with power. Thus, the NAND flash is used for backing up data in a cache memory in the storage device during blackout, for example.

When data is backed up in the storage device, parity data is added to the backed-up data to enable the data to be recovered when an error occurs in the data. Data backup into the NAND flash will be described with reference to FIG. 8.

FIG. 8 is a diagram illustrating an exemplary NAND flash control device according to a related technique. As illustrated in FIG. 8, a NAND flash control device 800 is connected to NAND flashes 910 to 940 configuring RAID (Redundant Arrays of Inexpensive Disks), respectively. Each of the NAND flashes 910 to 940 has a buffer and an array. The NAND flashes 910 to 930 store user data therein. The NAND flash 940 stores parity data therein.

In the example illustrated in FIG. 8, only a write DMA (Direct Memory Access) 810 among the DMAs provided in the NAND flash control device 800 is illustrated. The write DMA 810 includes a write unit 811, a parity generation unit 812, and a parity calculation RAM (Random Access Memory) 813.

There will be described below with reference to FIG. 9 a case in which in the NAND flash control device 800, user data is divided into three stripes to be written into the NAND flashes 910 to 930 and parity data is written into the NAND flash 940 by way of example. FIG. 9 is a sequence diagram illustrating data write operations by the NAND flash control device.

In the NAND flash control device 800, the first stripe is input into the write unit 811 and the parity generation unit 812. The write unit 811 writes the first stripe into a buffer 911 in the NAND flash 910 (step S901), and at the same time, the parity generation unit 812 writes the first stripe into the parity calculation RAM 813. Subsequently, in the NAND flash 910, the stripe written into the buffer 911 is written into an array 912 (step S902).

In the NAND flash control device 800, the second stripe is input into the write unit 811 and the parity generation unit 812. The write unit 811 writes the second stripe into a buffer 921 in the NAND flash 920 (step S903), and at the same time, the parity generation unit 812 performs the following processings. That is, the parity generation unit 812 reads the first stripe from the parity calculation RAM 813, and calculates parity data based on XOR with the second stripe and writes it into the parity calculation RAM 813. Subsequently, in the NAND flash 920, the stripe written into the buffer 921 is written into an array 922 (step S904).

Subsequently, in the NAND flash control device 800, the third stripe is input into the write unit 811 and the parity generation unit 812. The write unit 811 writes the third stripe into a buffer 931 in the NAND flash 930 (step S905), and at the same time, the parity generation unit 812 performs the following processings. That is, the parity generation unit 812 reads the parity data from the parity calculation RAM 813, and calculates parity data based on XOR with the third stripe and writes it into the parity calculation RAM 813. Subsequently, in the NAND flash 930, the stripe written into the buffer 931 is written into an array 932 (step S906).

After finishing writing the three stripes into the arrays in the NAND flashes, respectively, the write unit 811 reads the parity data from the parity calculation RAM 813 and writes the parity data into a buffer 941 in the NAND flash 940 (step S907). Then, in the NAND flash 940, the parity data written into the buffer 941 is written into an array 942 (step S908).

In this way, in the storage device, the data in the cache memory is saved into the NAND flashes to be backed up during blackout. There is known a technique in which when power is resumed while the blackout processing is being performed, unnecessary blackout processings or power resumption processings may be omitted.

Patent Literature 1: International Publication Pamphlet No. WO 2009/098776
Patent Literature 2: Japanese Laid-open Patent Publication No. 2005-182983

However, the related technique has a problem that a write capability is lowered by writing parity data.

In the example illustrated in FIG. 9, in the NAND flash control device 800, the third stripe is written into the array 932 in the NAND flash 930 and then parity data is written into the NAND flash 940. Thus, a user data writing end time delays by a time for writing the parity data.

SUMMARY

According to an aspect of the embodiments, a storage device includes a first group of memories including a plurality of memories that store a plurality of items of partial data obtained by dividing data; a first memory and a second memory that store parity data; a read unit that reads the parity data from the first memory or the second memory; a generation unit that generates parity data based on the read parity data and the partial data; and a write unit that writes the partial data into a memory included in the first group of memories, and writes the generated parity data into the second memory when the read unit read the parity data from the first memory and into the first memory when the read unit read the parity data from the second memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a sequence diagram illustrating data write operations by the NAND flash control device.

DESCRIPTION OF EMBODIMENTS

Preferred embodiments of the present invention will be explained with reference to accompanying drawings. The present invention is not limited to the embodiments. Each embodiment can be combined as needed without departing from the scope of the processing contents.

[a] First Embodiment

Structure of Storage Device According to First Embodiment

Figure 1:
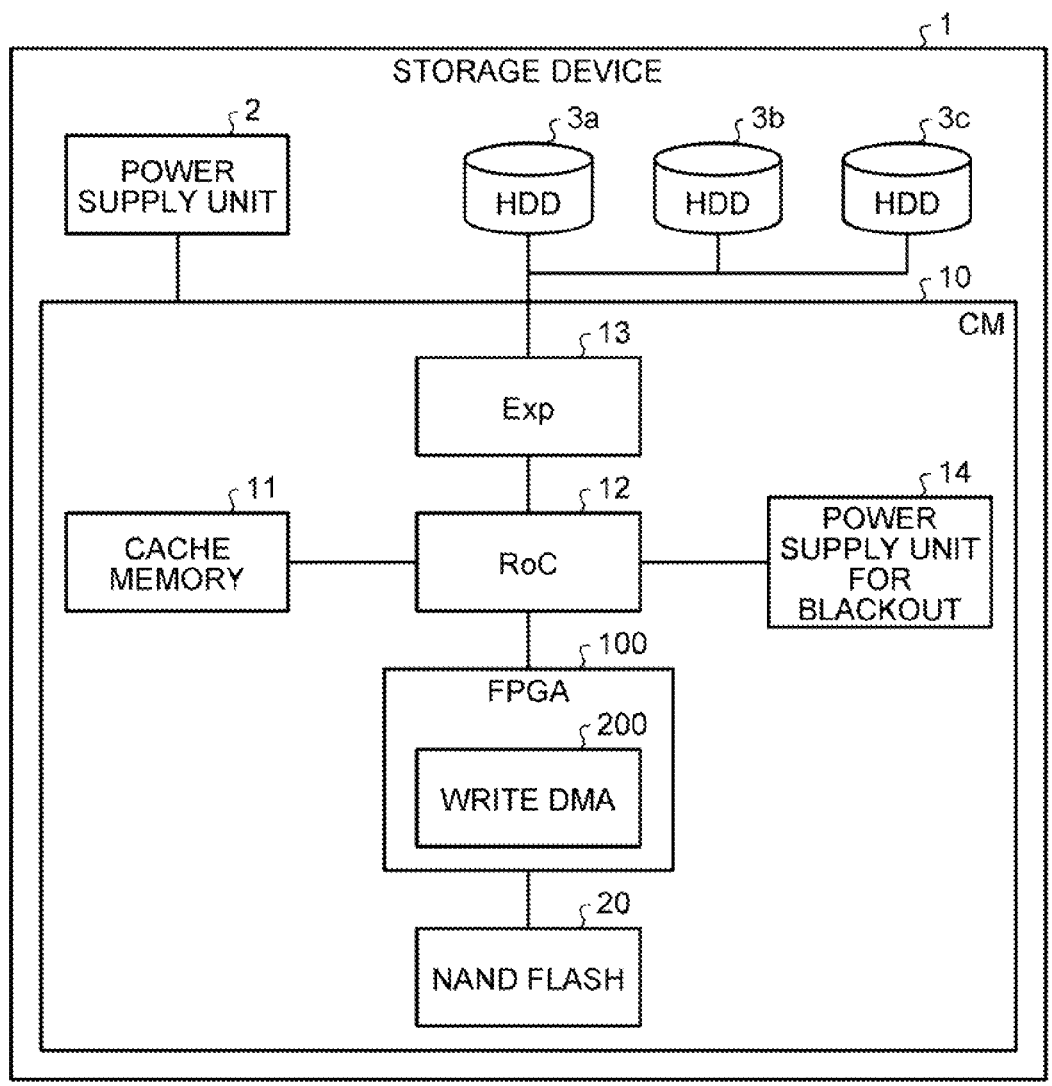
FIG. 1 is a block diagram illustrating a structure of a storage device according to a first embodiment.

FIG. 1 is a block diagram illustrating a structure of a storage device 1 according to a first embodiment. As illustrated in FIG. 1, the storage device 1 includes a power supply unit 2, HDDs (hard Disk Drive) 3a to 3c, and a CM (Controller Module) 10.

The power supply unit 2 supplies power to the CM 10 in the normal time. The HDDs 3a to 3c configure RAID (Redundant Arrays of Independent (Inexpensive) Disks), and store user data and programs therein. The normal time indicates a state where after the storage device 1 is powered on, it keeps running without blackout.

The CM 10 controls data to be input into and output from the HDDs 3a to 3c by an information processing device such as a server (not illustrated) connected to the storage device 1. For example, the CM 10 includes a cache memory 11, a RoC (RAID-on-Chip) 12, an Exp (Expander) 13, a power supply unit for blackout 14, a NAND flash 20, and a FPGA (Field Programmable Gate Array) 100.

The cache memory 11 is a nonvolatile memory such as DIMM (Dual Inline Memory Module) or DDR SDRAM (Double Date Rate Synchronous DRAM), and temporarily stores user data to be written into the HDDs 3a to 3c.

The RoC (RAID-on-Chip) 12 includes a CPU (Central Processing Unit) and a memory controller, and entirely controls the CM 10. For example, the RoC 12 performs a backup processing of the cache memory 11, interface control with an information processing apparatus such as a server (not illustrated), or management of the cache memory 11.

The Exp 13 relays user data to be exchanged between the RoC 12 and the HDDs 3a to 3c. The power supply unit for blackout 14 supplies power to the RoC 12, the cache memory 11, the FPGA 100 and the NAND flash 20 during blackout.

The NAND flash 20 is a nonvolatile semiconductor storage device, and functions as a backup storage device that saves data stored in the cache memory 11 when blackout occurs in the storage device 1. The NAND flash 20 includes a plurality of stripe NAND flashes that store a plurality of stripes obtained by dividing user data, respectively, and two parity NAND flashes that store parity data.

The FPGA 100 includes a write DMA (Direct Memory Access) and a read DMA for controlling data transfer between the cache memory 11 and the NAND flash 20 not via the CPU. In the example illustrated in FIG. 1, only a write DMA 200 out of the DMAs in the FPGA 100 is illustrated. A detailed structure of the write DMA 200 will be described later.

In the storage device 1, the FPGA 100 saves data from the cache memory 11 into the NAND flash 20 during blackout. For example, in the FPGA 100, the write DMA 200 reads user data from the cache memory 11, and divides the user data in a predetermined unit to generate stripes. Then, the write DMA 200 writes a stripe into any of a plurality of stripe NAND flashes and either of the two parity NAND flashes.

The write DMA 200 reads parity data from either of the parity NAND flashes. Then, the write DMA 200 generates parity data based on the read parity data and the stripe. Subsequently, the write DMA 200 writes the stripe into the stripe NAND flash and writes the generated parity data into the other parity NAND flash. That is, the write DMA 200 writes the parity data into a different parity NAND flash from the NAND flash from which parity data is read. Consequently, the write DMA 200 does not lower a write capability even when it writes the parity data.

Structure of Write DMA According to First Embodiment

Figure 2:
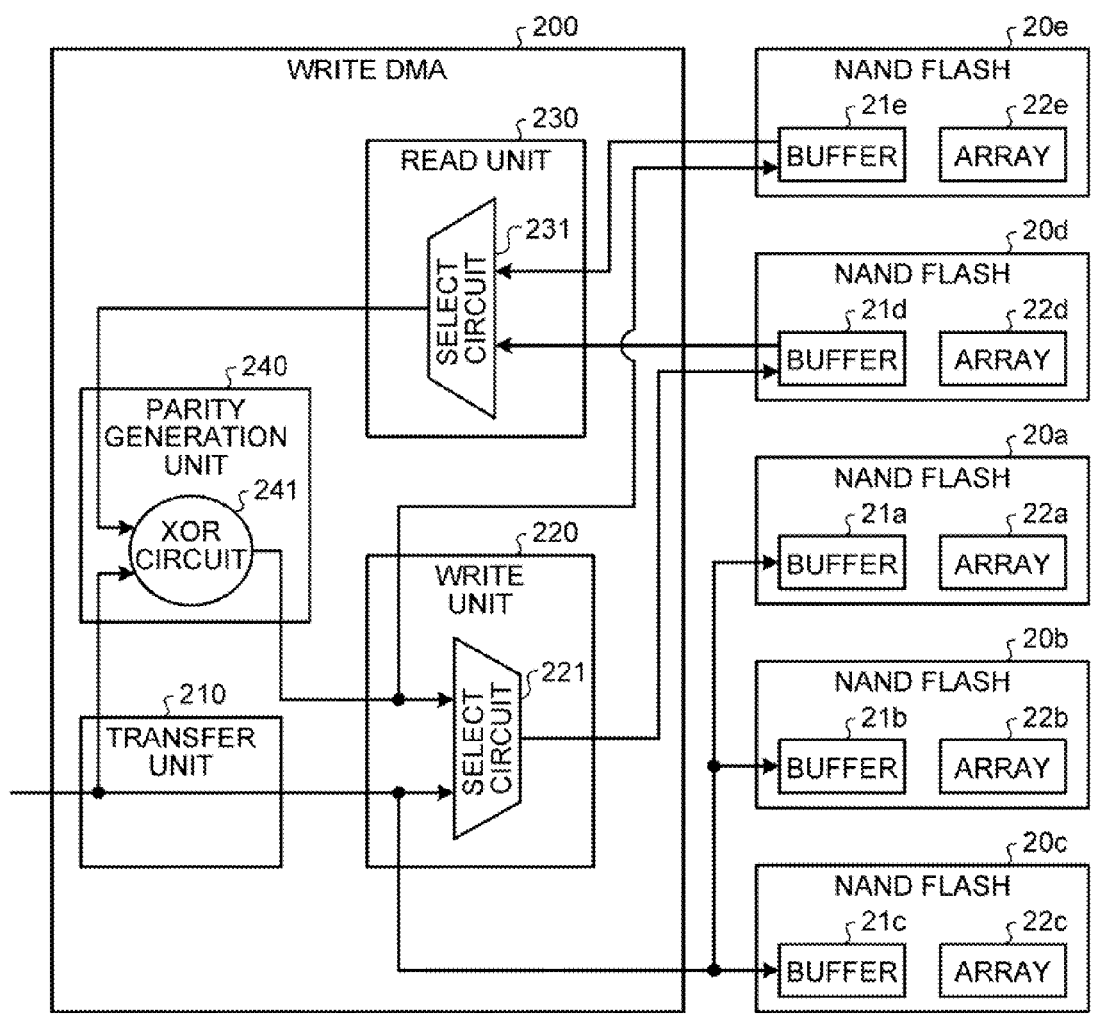
FIG. 2 is a block diagram illustrating a structure of a write DMA according to the first embodiment.

FIG. 2 is a block diagram illustrating a structure of the write DMA according to the first embodiment. As illustrated in FIG. 2, the write DMA 200 includes a transfer unit 210, a write unit 220, a read unit 230 and a parity generation unit 240. The write DMA 200 is connected to a NAND flashes 20a to 20e. An explanation will be made assuming that the NAND flashes 20a to 20c are stripe NAND flashes and the NAND flashes 20d and 20e are parity NAND flashes. The NAND flashes 20a to 20e include buffers 21a to 21e and arrays 22a to 22e, respectively.

The transfer unit 210 reads the stripes which are the divided user data in a predetermined unit from the cache memory 11, and transfers the stripes to the write unit 220 and the parity generation unit 240. When the read stripe is the last stripe of the user data, the transfer unit 210 notifies, to the write unit 220, that the stripe to be transferred is the last stripe.

The write unit 220 writes the user data transferred from the transfer unit 210 into each buffer in the designated NAND flashes 20a to 20c. The write unit 220 performs writing the user data into each NAND flash per stripe divided in a predetermined unit.

For example, the write unit 220 writes the first stripe of the user data into the buffer 21a in the NAND flash 20a. Subsequently, the write unit 220 writes the second stripe into the buffer 21b in the NAND flash 20b, and writes the third stripe into the buffer 21c in the NAND flash 20c. The write unit 220 repeatedly performs the same processing as the processing of writing the first to third stripes into the buffers in the NAND flashes on the fourth and subsequent stripes.

The write unit 220 includes a select circuit 221, and inputs the first stripe into the select circuit 221. Thereby, the write unit 220 writes the first stripe of the user data into the buffer 21a in the NAND flash 20a, and at the same time, writes the first stripe into the buffer 21d in the NAND flash 20d. An explanation will be made assuming that the first stripe written into the parity NAND flash is handled as parity data.

The write unit 220 writes a stripe into each buffer in the designated NAND flashes 20a to 20c, and at the same time, alternately writes the parity data generated by the parity generation unit 240 into the buffers of the NAND flashes 20d and 20e.

For example, the write unit 220 writes the second stripe into the buffer 21b in the NAND flash 20b, and at the same time, writes parity data into the buffer 21e in the NAND flash 20e. Then, the write unit 220 writes the third stripe into the buffer 21c in the NAND flash 20c, and at the same time, writes parity data into the buffer 21d in the NAND flash 20d.

The write unit 220 writes the stripes into the buffers in the stripe NAND flashes, and then writes the same from the buffers in the stripe NAND flashes into the arrays. Then, the write unit 220 writes the last stripe from the buffer in the stripe NAND flash into the array, and at the same time, writes the parity data from the buffer in the parity NAND flash into the array.

The read unit 230 includes a select circuit 231, and alternately reads the parity data stored in the buffers in the NAND flashes 20d and 20e, and outputs the same to the parity generation unit 240.

For example, the read unit 230 reads and outputs the first stripe from the NAND flash 20d to the parity generation unit 240 when the second stripe is input into the parity generation unit 240. The read unit 230 reads and outputs the parity data from the NAND flash 20e to the parity generation unit 240 when the third stripe is input into the parity generation unit 240. It is assumed that no data is stored in the buffers in the NAND flashes 20d and 20e when the first stripe is input into the parity generation unit 240.

The parity generation unit 240 includes an XOR circuit 241, receives the parity data output from the read unit 230 and the stripe transferred from the transfer unit 210, and calculates XOR with the parity data and the stripe to generate parity data. Then, the parity generation unit 240 outputs the generated parity data to the write unit 220.

Processing Operations by Write DMA According to First embodiment

Figure 3:
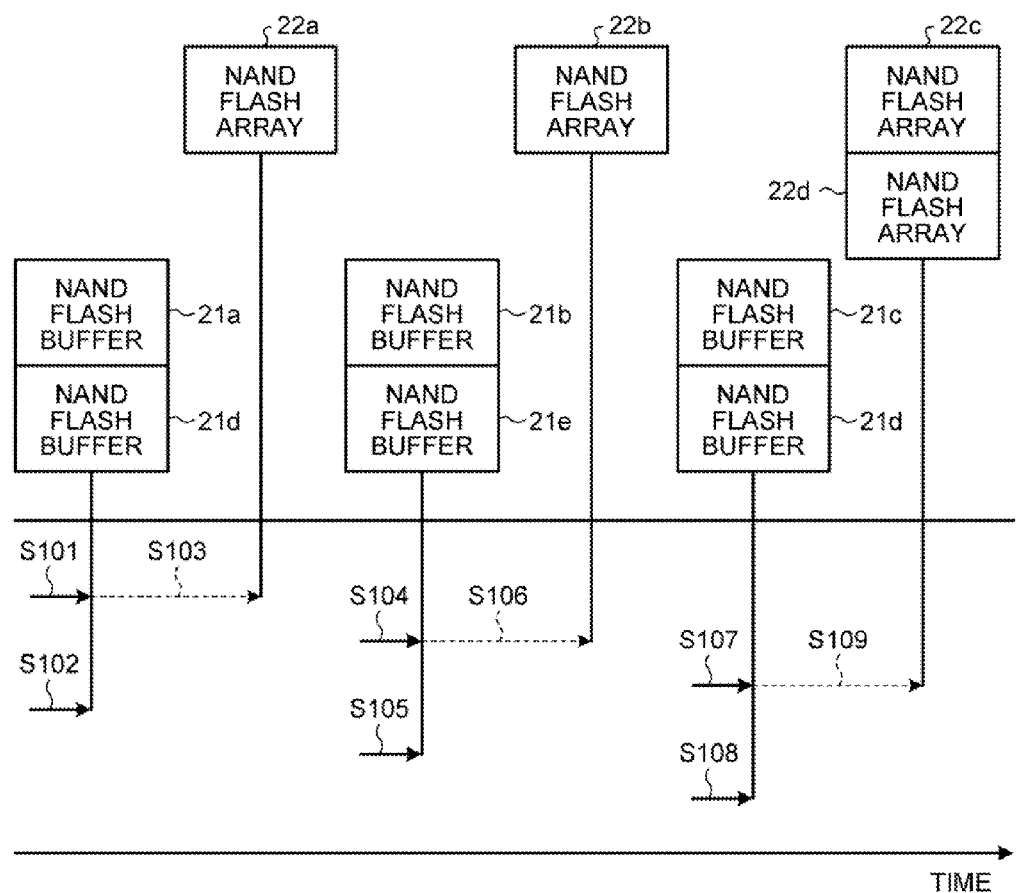
FIG. 3 is a sequence diagram illustrating data write operations by the write DMA according to the first embodiment.

The data write operations by the write DMA 200 according to the first embodiment will be described below with reference to FIG. 3. FIG. 3 is a sequence diagram illustrating the data write operations by the write DMA according to the first embodiment. There will be described herein a case where the write DMA 200 writes three stripes into the NAND flashes by way of example. Herein, the third stripe is the last stripe.

As illustrated in FIG. 3, the write DMA 200 writes the first stripe into the buffer 21a in the NAND flash 20a (step S101). At the same time with the processing in step S101, the write DMA 200 writes the first stripe into the buffer 21d in the NAND flash 20d (step S102). Subsequently, in the NAND flash 20a, the stripe written into the buffer 21a is written into the array 22a (step S103).

The write DMA 200 writes the second stripe into the buffer 21b in the NAND flash 20b (step S104). At the same time with the processing in step S104, the write DMA 200 reads the first stripe from the buffer 21d, calculates parity data based on XOR with the second stripe, and writes it into the buffer 21e (step S105). Subsequently, in the NAND flash 20b, the stripe written into the buffer 21b is written into the array 22b (step S106).

The write DMA 200 writes the third stripe into the buffer 21c in the NAND flash 20c (step S107). At the same time with the processing in step S107, the write DMA 200 reads the parity data from the buffer 21e, calculates parity data based on XOR with the third stripe, and writes it into the buffer 21d (step S108). Subsequently, in the NAND flash 20c, the stripe written into the buffer 21c is written into the array 22c, and at the same time, in the NAND flash 20d, the stripe written into the buffer 21d is written into the array 22d (step S109).

Processing Procedure of Processings by Write DMA according to First Embodiment

Figure 4:
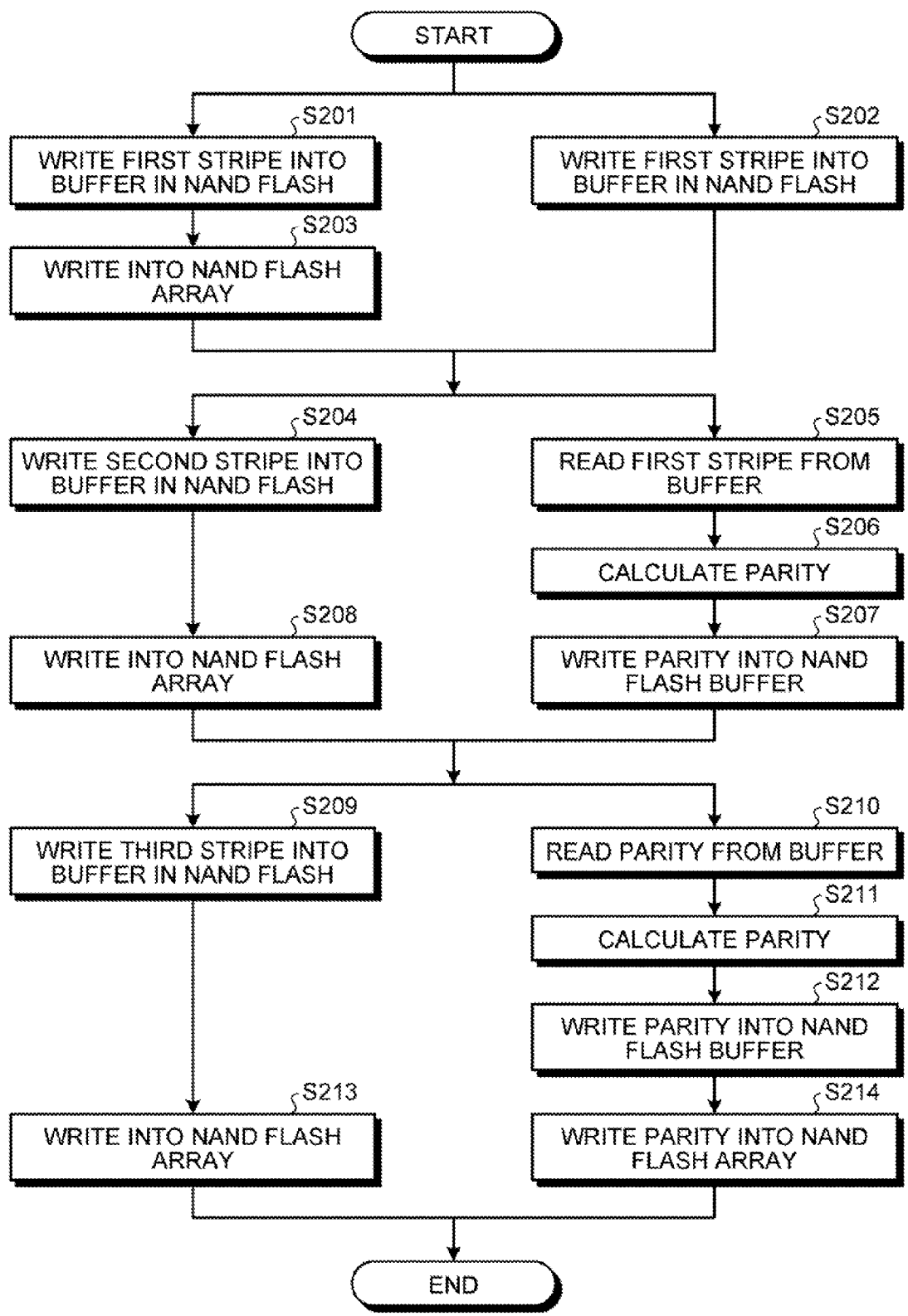
FIG. 4 is a flowchart illustrating a processing procedure of the data write processings by the write DMA according to the first embodiment.

A processing procedure of the processings by the write DMA according to the first embodiment will be described below with reference to FIG. 4. FIG. 4 is a flowchart illustrating the processing procedure of the data write processings by the write DMA according to the first embodiment. There will be described herein a case in which the write DMA 200 writes three stripes into the NAND flashes by way of example. Herein, the third stripe is the last stripe.

As illustrated in FIG. 4, the write unit 220 writes the first stripe into the buffer 21a in the NAND flash 20a (step S201). At the same time with the processing in step S201, the write unit 220 writes the first stripe into the buffer 21d in the NAND flash 20d (step S202). Subsequently, in the NAND flash 20a, the stripe written into the buffer 21a is written into the array 22a (step S203).

The write unit 220 writes the second stripe into the buffer 21b in the NAND flash 20b (step S204). The read unit 230 reads the first stripe from the buffer 21d (step S205). Then, the parity generation unit 240 calculates parity data based on XOR with the stripe read by the read unit 230 and the second stripe (step S206). The write unit 220 writes the parity data into the buffer 21e (step S207). The processings in step S205 to step S207 are performed at the same time with the processing in step S204. Subsequently, in the NAND flash 20b, the stripe written into the buffer 21b is written into the array 22b (step S208).

The write unit 220 writes the third stripe into the buffer 21c in the NAND flash 20c (step S209). The read unit 230 reads the parity data from the buffer 21e (step S210). Then, the parity generation unit 240 calculates parity data based on XOR with the parity data read by the read unit 230 and the third stripe (step S211). The write unit 220 writes the parity data into the buffer 21d (step S212). The processings in step S210 to step S212 are performed at the same time with the processing in step S209.

Subsequently, in the NAND flash 20c, the stripe written into the buffer 21c is written into the array 22c (step S213). At the same time with the processing in step S213, the stripe written into the buffer 21d is written into the array 22d in the NAND flash 20d (step S214).

Effects of Storage Device According to First Embodiment

The storage device 1 according to the first embodiment has the two parity NAND flashes, and alternately writes parity data into the buffers in the parity NAND flashes. Thereby, the storage device 1 according to the first embodiment writes parity data into the array in the NAND flash at the same time with the writing of the last stripe into the array in the NAND flash. Consequently, with the storage device 1 according to the first embodiment, a write capability does not lower even when the parity data is written therein.

In a related technique, a RAM in the write DMA is used for calculating parity data. The RAM holds the calculation values of the parity data for write units. Thus, when the number of write units increases, the size of the RAM in the write DMA also increases, thereby repressing the resource. When the write unit of the NAND flash is changed, the write DMA is to be modified.

On the other hand, the storage device 1 according to the first embodiment alternately uses the two NAND flashes to calculate parity data. Thereby, the parity calculation RAM in the write DMA may be removed from the storage device 1 according to the first embodiment. Consequently, the storage device 1 according to the first embodiment does not need modification of the write DMA even when the write unit of the NAND flash is changed.

[b] Second Embodiment

The storage device 1 according to the first embodiment includes the two parity NAND flashes, and alternately writes parity data into the buffers in the parity NAND flashes. Then, the storage device 1 according to the first embodiment writes the parity data into the array in one NAND flash at the same time with the writing of the last stripe into the array in the NAND flash. In this case, the parity data is stored in the array in one NAND flash, but the parity data is not stored in the array in the other NAND flash. Thus, the storage device 1 according to the first embodiment may effectively use the arrays in the parity NAND flashes.

There will be described in the second embodiment a case in which parity data is alternately written into the two parity NAND flashes when two items of user data made of group 1 and group 2 are successively written into the stripe NAND flashes. It is assumed herein that the user data of group 1 contains an even number of stripes and the user data of group 2 contains an odd number of strips.

Structure of Storage Device According to Second Embodiment

A structure of a storage device according to a second embodiment will be described below. The structure of the storage device according to the second embodiment is the same as the structure of the storage device according to the first embodiment except that the function of the write DMA in the storage device illustrated in FIG. 1 is different. Thus, only the different write DMA from that according to the first embodiment will be described below. The number of NAND flashes is changed in the storage device according to the second embodiment, and the change will be described below.

Structure of Write DMA According to Second Embodiment

Figure 5:
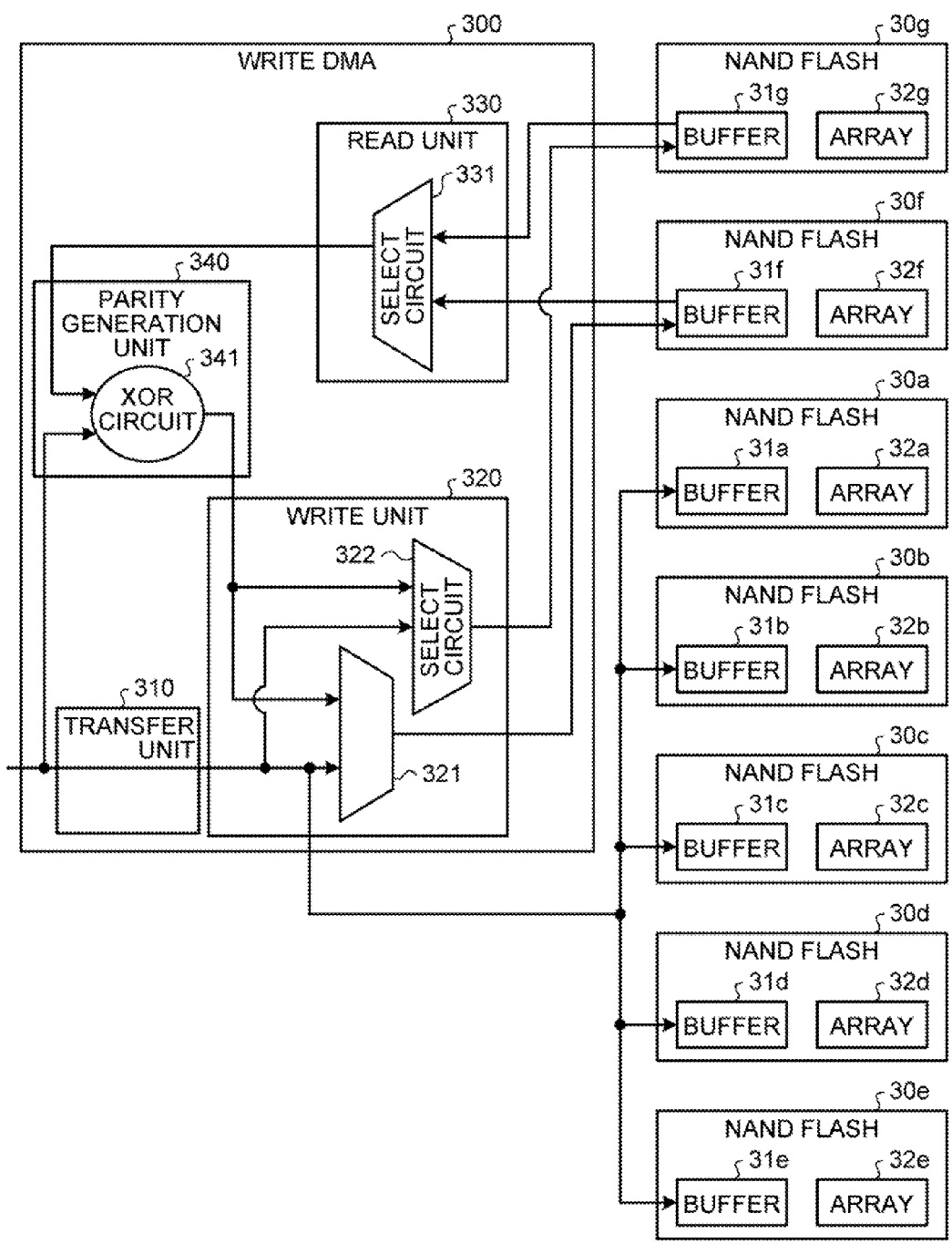
FIG. 5 is a block diagram illustrating a structure of a write DMA according to a second embodiment.

A structure of the write DMA according to the second embodiment will be described below with reference to FIG. 5. FIG. 5 is a block diagram illustrating the structure of the write DMA according to the second embodiment. As illustrated in FIG. 5, the write DMA according to the second embodiment includes a transfer unit 310, a write unit 320, a read unit 330 and a parity generation unit 340.

A write DMA 300 is connected to NAND flashes 30a to 30g. It is assumed herein that the NAND flashes 30a to 30e are stripe NAND flashes and the NAND flashes 30f and 30g are parity NAND flashes. Each of the NAND flashes 30a to 30g has a buffer and an array.

In the second embodiment, it is assumed that the NAND flashes 30a and 30b are used as the NAND flashes for group 1 and the NAND flashes 30c to 30e are used as the NAND flashes for group 2. Subsequent to writing the user data of group 1, the user data of group 2 is written, but the write order is not limited thereto. For example, subsequent to writing the user data of group 2, the user data of group 1 may be written.

The transfer unit 310 reads the user data from the cache memory 11 as stripes divided in a predetermined unit, and transfers the stripes to the write unit 320 and the parity generation unit 340. It is assumed herein that the transfer unit 310 divides and transfers the user data into the user data of group 1 including an even number of stripes and the user data of group 2 including an odd number of stripes.

When the read stripe is of the user data of group 1, the transfer unit 310 notifies, to the write unit 320, that the stripe to be transferred is the stripe of group 1. When the read stripe is of the user data of group 2, the transfer unit 310 notifies, to the write unit 320, that the stripe to be transferred is the stripe of group 2. When the read stripe is the last stripe in each group, the transfer unit 310 notifies, to the write unit 320, that the stripe to be transferred is the last stripe.

The write unit 320 writes the user data transferred from the transfer unit 310 into each buffer in the designated NAND flashes 30a to 30e. For example, the write unit 320 writes the stripes of group 1 into the NAND flashes 30a and 30b, and writes the strips of group 2 into the NAND flashes 30c to 30e.

By way of example, the write unit 320 writes the first stripe of group 1 into the NAND flash 30a. Subsequently, the write unit 320 writes the second stripe of group 1 into the NAND flash 30b. The write unit 320 repeatedly performs the same processing as the processing of writing the first stripe of group 1 to the second stripe of group 1 into the NAND flashes on the third and subsequent stripes of group 1.

The write unit 320 writes the first stripe of group 2 into the NAND flash 30c. Then, the write unit 320 writes the second stripe of group 2 into the NAND flash 30d. Subsequently, the write unit 320 writes the third stripe of group 2 into the NAND flash 30e. The write unit 320 repeatedly performs the same processing as the processing of writing the first stripe of group 2 to the third stripe of group 2 into the NAND flashes on the fourth and subsequent stripes of group 2.

For example, the write unit 320 includes select circuits 321 and 322, and inputs the first stripe of group 1 into the select circuit 321. Thereby, the write unit 320 writes the first stripe of group 1 into the NAND flash 30a, and at the same time, writes the first stripe of group 1 into the NAND flash 30f.

The write unit 320 writes the user data into each buffer in the designated NAND flashes 30a to 30b or 30c to 30e, and at the same time, alternately writes the parity data generated by the parity generation unit 340 into the buffers in the NAND flashes 30f and 30g.

The write unit 320 alternately inputs the parity data output by the parity generation unit 340 into the select circuits 321 and 322. Thereby, the write unit 320 writes the second stripe of group 1 into the NAND flash 30b, and at the same time, writes the parity data into the NAND flash 30g.

Subsequently, the write unit 320 inputs the first stripe of group 2 into the select circuit 322. Thereby, the write unit 320 writes the first stripe of group 2 into the NAND flash 30c, and at the same time, writes the first stripe of group 2 into the NAND flash 30f.

The write unit 320 alternately inputs the parity data output by the parity generation unit 340 into the select circuits 321 and 322. Thereby, the write unit 320 writes the second stripe of group 2 into the NAND flash 30d, and at the same time, writes the parity data into the NAND flash 30g. Then, the write unit 320 writes the third stripe of group 2 into the NAND flash 30e, and at the same time, writes the parity data into the NAND flash 30f.

The write unit 320 writes the stripes into the buffers in the stripe NAND flashes, and then writes them from the buffers in the stripe NAND flashes into the arrays. Then, the write unit 320 writes the last stripe of each group from the buffer in the stripe NAND flash into the array, and at the same time, writes the parity data from the buffer in the parity NAND flash into the array.

The functions of the read unit 330 are the same as the functions of the read unit 230 according to the first embodiment. The functions of the parity generation unit 340 are the same as the functions of the parity generation unit 240 according to the first embodiment.

Processing Operations by Write DMA According to Second Embodiment

Figure 6:
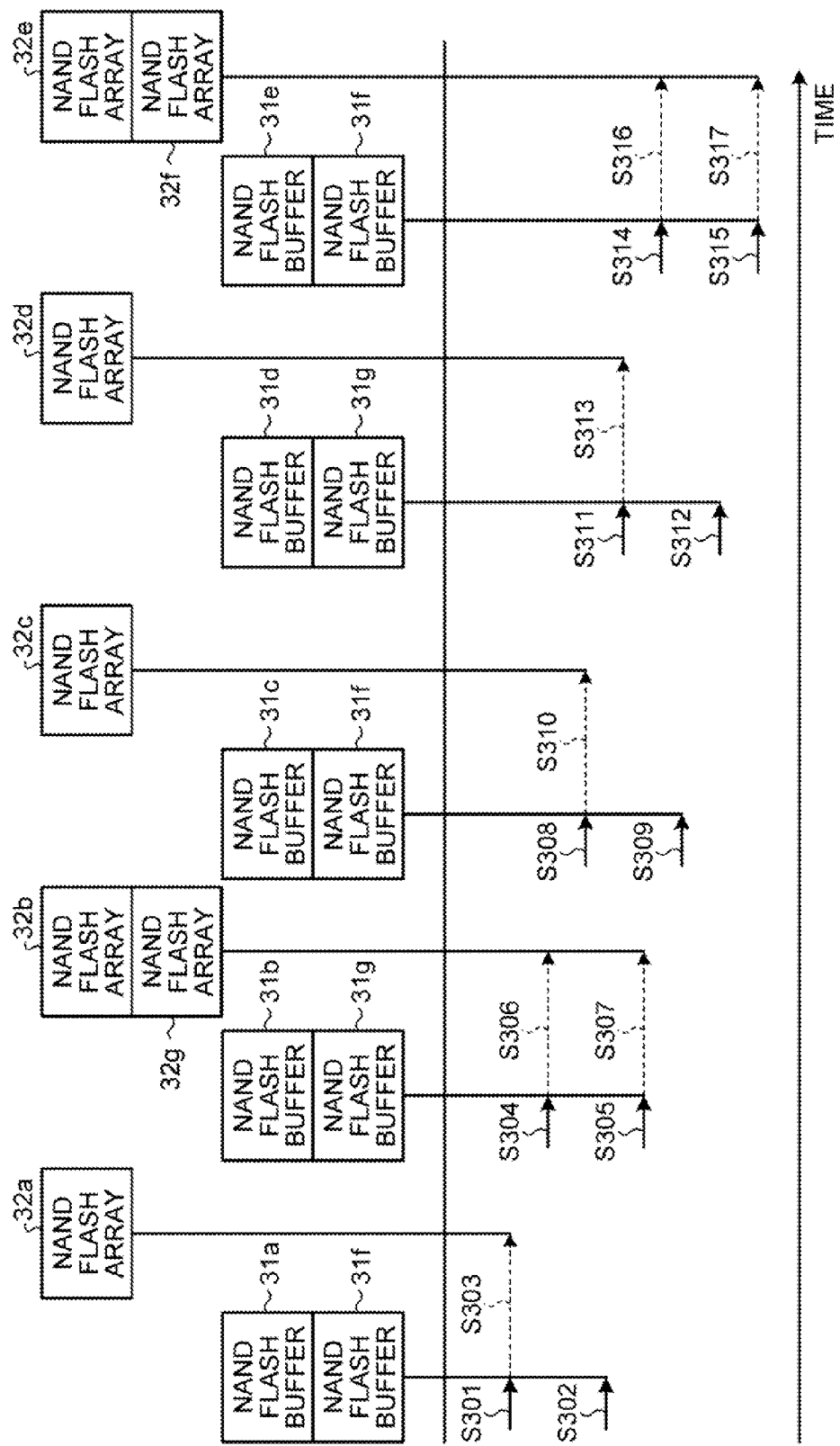
FIG. 6 is a sequence diagram illustrating data write operations by the write DMA according to the second embodiment.

The data write operations by the write DMA according to the second embodiment will be described below with reference to FIG. 6. FIG. 6 is a sequence diagram illustrating the data write operations by the write DMA according to the second embodiment. There will be described herein a case in which the write DMA 300 writes group 1 containing two stripes and group 2 containing three stripes into the NAND flashes in this order by way of example. Herein, the second stripe of group 1 and the third stripe of group 2 are the last stripes.

As illustrated in FIG. 6, the write DMA 300 writes the first stripe of group 1 into a buffer 31*a* in the NAND flash 30*a* (step S301). At the same time with the processing in step S301, the write DMA 300 writes the first stripe of group 1 into a buffer 31*f* in the NAND flash 30*f* (step S302). Subsequently, in the NAND flash 30*a*, the stripe written into the buffer 31*a* is written into an array 32*a* (step S303).

The write DMA 300 writes the second stripe of group 1 into a buffer 31*b* in the NAND flash 30*b* (step S304). At the same time with the processing in step S104, the write DMA 300 reads the first stripe of group 1 from the buffer 31*f*, and calculates parity data based on XOR with the second stripe of group 1 and writes it into a buffer 31*g* (step S305).

Subsequently, in the NAND flash 30*b*, the stripe written into the buffer 31*b* is written into an array 32*b* (step S306). At the same time with the processing in step S306, in the NAND flash 30*g*, the stripe written into the buffer 31*g* is written into an array 32*g* (step S307).

The write DMA 300 writes the first stripe of group 2 into a buffer 31*c* in the NAND flash 30*c* (step S308). At the same time with the processing in step S308, the write DMA 300 writes the first stripe of group 2 into the buffer 31*f* in the NAND flash 30*f* (step S309). Subsequently, in the NAND flash 30*c*, the stripe written into the buffer 31*c* is written into an array 32*c* (step S310).

The write DMA 300 writes the second stripe of group 2 into a buffer 31*d* in the NAND flash 30*d* (step S311). At the same time with the processing in step S311, the write DMA 300 reads the first stripe of group 2 from the buffer 31*f*, and calculates parity data based on XOR with the second stripe of group 2 and writes it into the buffer 31*g* (step S312). Subsequently, in the NAND flash 30*d*, the stripe written into the buffer 31*d* is written into an array 32*d* (step S313).

The write DMA 300 writes the third stripe of group 2 into a buffer 31*e* in the NAND flash 30*e* (step S314). At the same time with the processing in step S314, the write DMA 300 reads the parity data from a buffer 31*g*, and calculates parity data based on XOR with the third stripe of group 2 and writes it into the buffer 31*f* (step S315). Subsequently, in the NAND flash 30*e*, the stripe written into the buffer 31*e* is written into an array 32*e* (step S316). At the same time with the processing in step S316, in the NAND flash 30*f*, the stripe written into the buffer 31*f* is written into an array 32*f* (step S317).

Processing Procedure of Processings by Write DMA According to Second Embodiment

Figure 7:
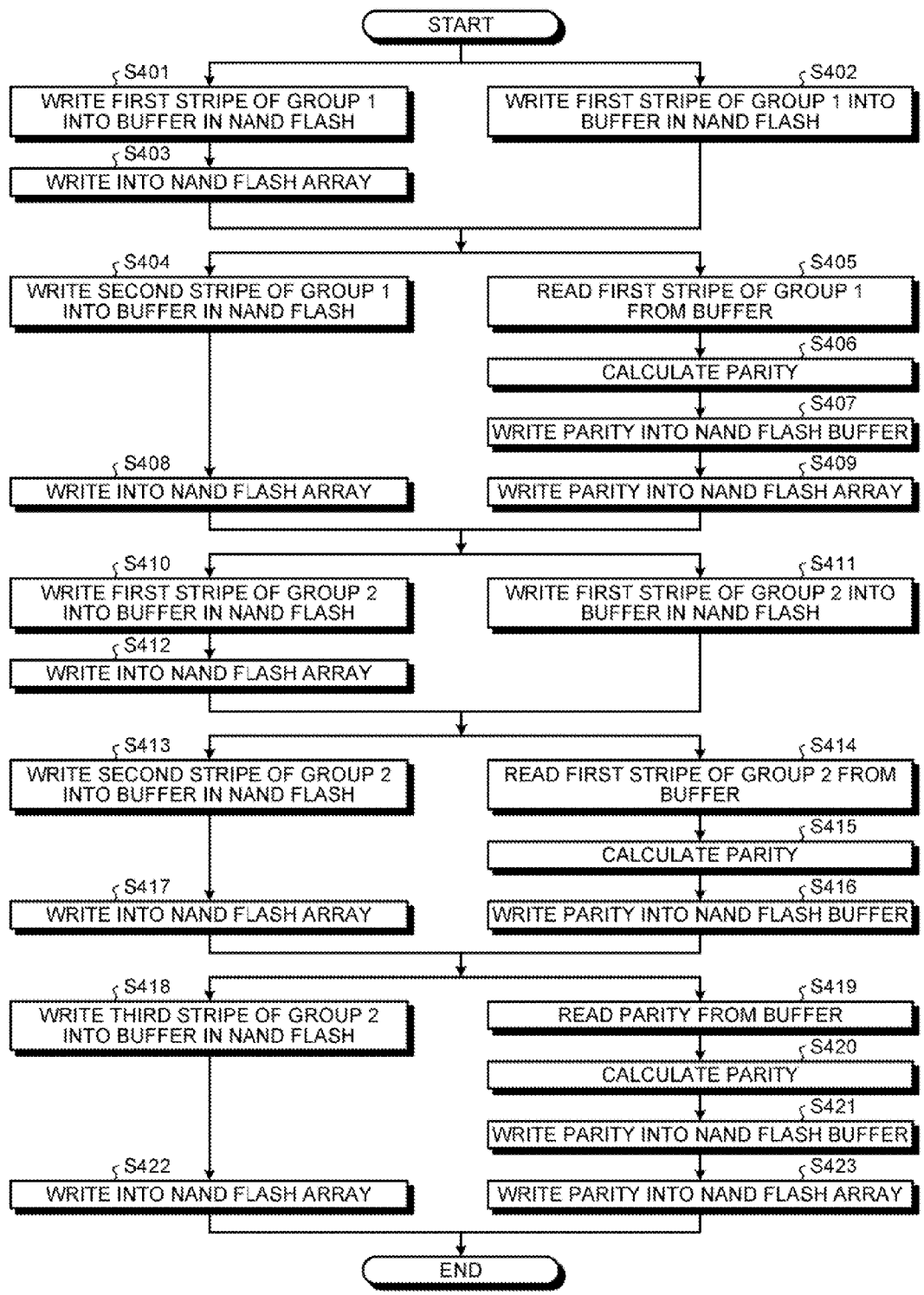
FIG. 7 is a flowchart illustrating a processing procedure of the data write processings by the write DMA according to the second embodiment.
Figure 8:
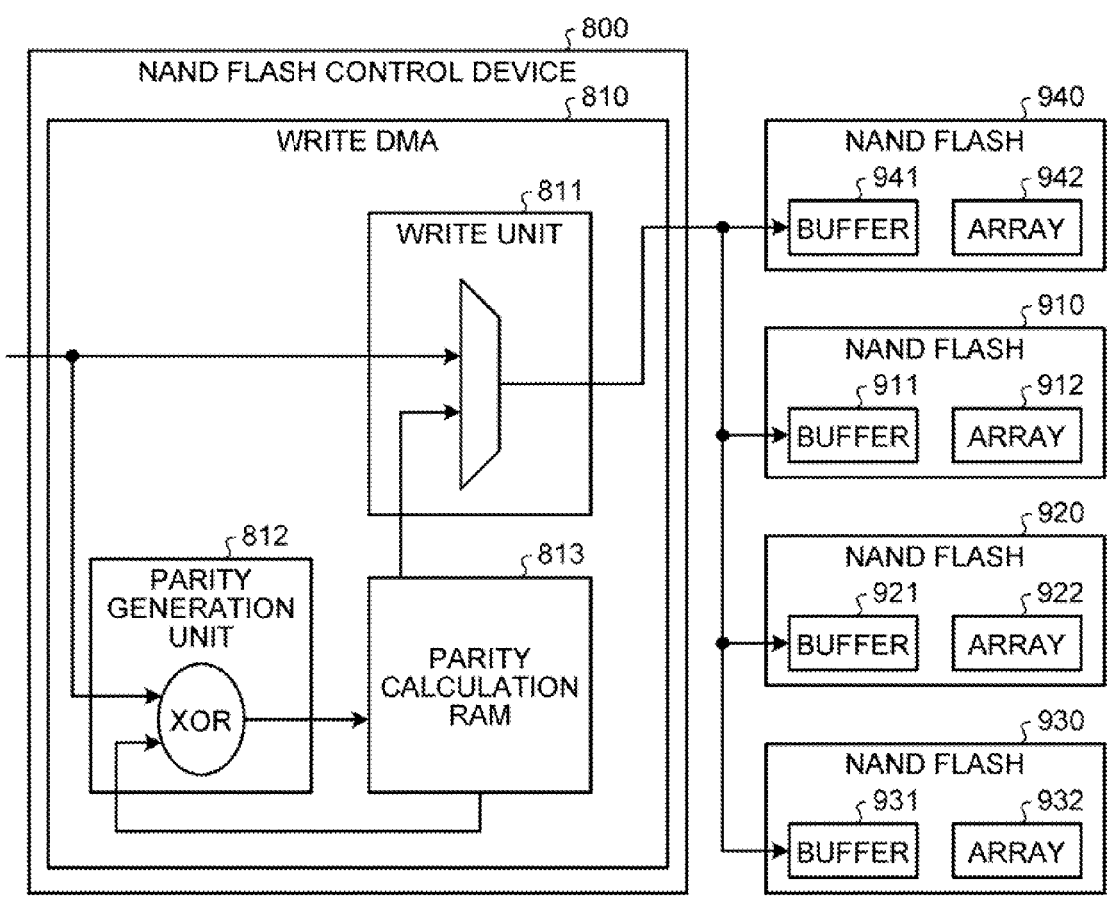
FIG. 8 is a diagram illustrating an exemplary NAND flash control device according to a related technique.

The processing procedure of the processings by the write DMA according to the second embodiment will be described below with reference to FIG. 7. FIG. 7 is a flowchart illustrating the processing procedure of the data write processings by the write DMA according to the second embodiment. There will be described herein a case in which the write DMA 300 writes group 1 containing two stripes and group 2 containing three stripes into the NAND flashes in this order by way of example. Herein, the second stripe of group 1 and the third stripe of group 2 are the last stripes.

As illustrated in FIG. 7, the write unit 320 writes the first stripe of group 1 into the buffer 31*a* in the NAND flash 30*a* (step S401). At the same time with the processing in step S401, the write unit 320 writes the first stripe of group 1 into the buffer 31*f* in the NAND flash 30*f* (step S402). Subsequently, in the NAND flash 30*a*, the stripe written into the buffer 31*a* is written into the array 32*a* (step S403).

Then, the write unit 320 writes the second stripe of group 1 into the buffer 31*b* in the NAND flash 30*b* (step S404). The read unit 330 reads the first stripe of group 1 from the buffer 31*f* (step S405). Then, the parity generation unit 340 calculates parity data based on XOR with the first stripe of group 1 read by the read unit 330 and the second stripe of group 1 (step S406). The write unit 320 writes the parity data into the buffer 31*g* (step S407). The processings in step S405 to step S407 are performed at the same time with the processing in step S404.

Subsequently, in the NAND flash 30*b*, the stripe written into the buffer 31*b* is written into the array 32*b* (step S408). At the same time with the processing in step S408, in the NAND flash 30*g*, the stripe written into the buffer 31*g* is written into the array 32*g* (step S409).

Then, the write unit 320 writes the first stripe of group 2 into the buffer 31*c* in the NAND flash 30*c* (step S410). At the same time with the processing in step S410, the write unit 320 writes the first stripe of group 2 into the buffer 31*f* in the NAND flash 30*f* (step S411). Subsequently, in the NAND flash 30*c*, the stripe written into the buffer 31*c* is written into the array 32*c* (step S412).

The write unit 320 writes the second stripe of group 2 into the buffer 31*d* in the NAND flash 30*d* (step S413). The read unit 330 reads the first stripe of group 2 from the buffer 31*f* (step S414). Then, the parity generation unit 340 calculates parity data based on XOR with the first stripe of group 2 read by the read unit 330 and the second stripe of group 2 (step S415). The write unit 320 writes the parity data into the buffer 31*g* (step S416). The processings in step S414 to step S416 are performed at the same time with the processing in step S413. Subsequently, in the NAND flash 30*d*, the stripe written into the buffer 31*d* is written into the array 32*d* (step S417).

The write unit 320 writes the third stripe of group 2 into the buffer 31*e* in the NAND flash 30*e* (step S418). The read unit 330 reads the parity data from the buffer 31*g* (step S419). Then, the parity generation unit 340 calculates parity data based on XOR with the parity data read by the read unit 330 and the third stripe of group 2 (step S420). The write unit 320 writes the parity data into the buffer 31*f* (step S421). The processings in step S419 to step S421 are performed at the same time with the processing in step S418.

Subsequently, in the NAND flash 30*e*, the stripe written into the buffer 31*e* is written into the array 32*e* (step S422). At the same time with the processing in step S422, in the NAND flash 30*f*, the stripe written into the buffer 31*f* is written into the array 32*f* (step S423).

Effects of Second Embodiment

As described above, the storage device according to the second embodiment does not lower the write capability even when parity data is written therein. The storage device according to the second embodiment can effectively use the arrays in the parity NAND flashes. Consequently, two items of parity data can be generated for user data, thereby enhancing a recovery accuracy when an error occurs in the user data, for example.

System Structure and Others

All or part of the processings described to be automatically performed, among the processings described in the present embodiment, may be manually performed. Alternatively, all or part of the processings described to be manually performed may be automatically performed in a well-known method. In addition, the processing procedures, the control procedures and the specific names described in the description and the drawings may be arbitrarily changed unless otherwise stated.

The first and second embodiments have described the case where the storage device saves data from the cache memory 11 to the NAND flashes during blackout by way of example, but are not limited thereto. For example, the storage device may use NAND flashes for data storage in the normal time. Also in this case, the storage device does not lower the write capability even when parity data is written therein.

The order of a processing in each step in the processings described in each embodiment may be changed according to various loads or use situation. For example, the order of the processings in step S401 to step S409 illustrated in FIG. 7 and the processings in step S410 to step S423 may be changed.

The first and second embodiments have described the case where the NAND flashes are used as nonvolatile memories, but are not limited thereto. For example, a HDD or ROM (Read Only Memory) may be used as a nonvolatile memory.

The illustrated respective constituents are functionally conceptual, and do not need to be physically configured as illustrated. For example, the write DMA 200 according to the first embodiment may integrate the read unit 230 and the parity generation unit 240 therein.

It is possible to prevent a write capability from being lowered even when parity data is written.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
    a first group of memories including a plurality of memories, each having a temporary storage area and a storage area, that store a plurality of items of partial data obtained by dividing data;
    a first memory and a second memory, the first memory having a first temporary storage area and a first storage area, the second memory having a second temporary storage area and a second storage area;
    a read unit that alternately reads parity data from the first temporary storage area and the second temporary storage area;
    a generation unit that generates parity data based on the read data from the first memory or the second memory by the read unit and the partial data; and
    a write unit that writes the partial data from temporary storage areas into storage areas in the plurality of memories included the first group of memories, and alternately writes the generated parity data based on data from the first memory into the second temporary storage area when the read unit reads the parity data from the first memory and the generated parity data based on data from the second memory into the first temporary storage area when the read unit reads the parity data from the second memory, the write unit writing last partial data from the temporary storage areas into the storage areas in the plurality of memories included in the first group of memories when partial data to be written is the last partial data, and at the same time, writing parity data from the first temporary storage area into the first storage area or from the second temporary storage area into the second storage area.

2. The storage device according to claim 1, wherein when writing first data divided into an odd number of items of partial data and second data divided into an even number of items of partial data into the plurality of memories included in the first group of memories, the write unit writes parity data for the first data into the first storage area or the second storage area, and writes parity data for the second data into the second memory when the parity data for the first data is written into the first memory, and into the first memory when the parity data for the first data is written into the second memory.

3. A method of controlling a storage device having a first group of memories including a plurality of memories, each having a temporary storage area and a storage area, that store a plurality of items of partial data obtained by dividing data, the method comprising:
    alternately reading the parity data from a first temporary storage area in the first memory or a second temporary storage area in the second memory;
    generating parity data based on the read data from the first memory or the second memory and the partial data;
    writing the partial data from temporary storage areas into the storage areas in the first group of memories, and alternately writing the generated parity data based on data from the first memory into the second temporary storage area when the reading reads the parity data from the first memory and the generated parity data based on data from the second memory into the first temporary storage area when the reading reads the parity data from the second memory;
    writing the last partial data from the temporary storage areas into the storage areas in the plurality of memories included in the first group of memories when partial data to be written is the last partial data, and at the same time, writing parity data from the first temporary storage area into a first storage area in the first memory or from the second temporary storage area into a second storage area in the second memory.

* * * * *